E. B. SYMONS.
STONE CRUSHER.
APPLICATION FILED MAY 27, 1907.
1,000,049.
Patented Aug. 8, 1911.
3 SHEETS—SHEET 3.
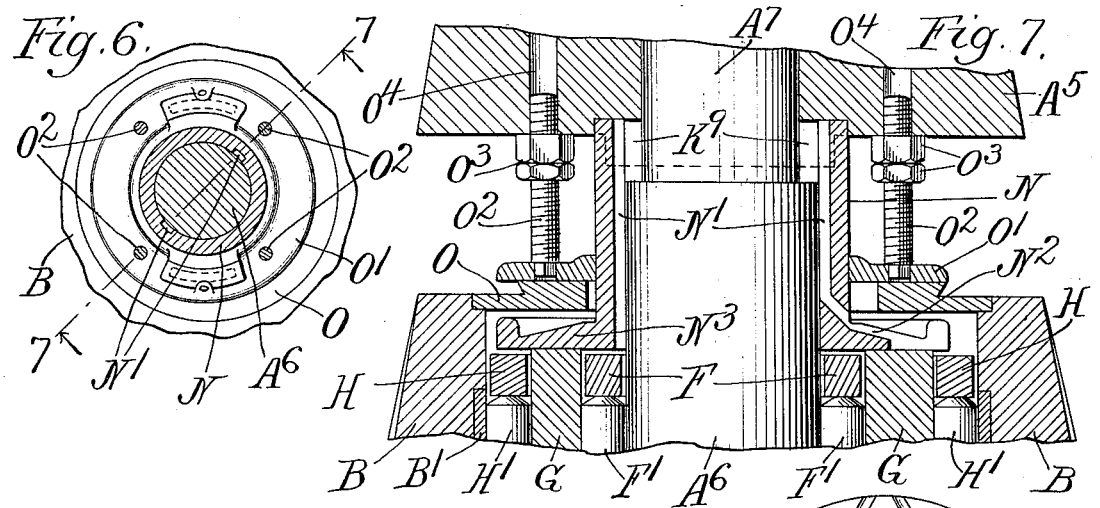
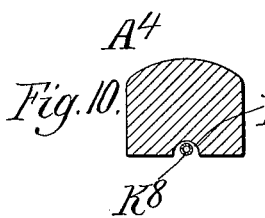
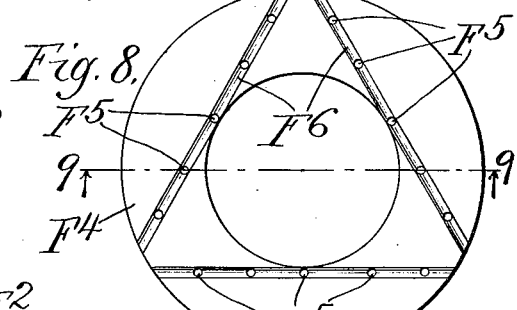
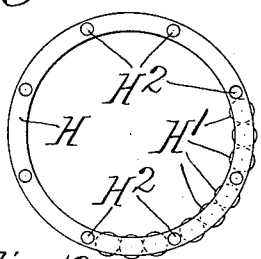
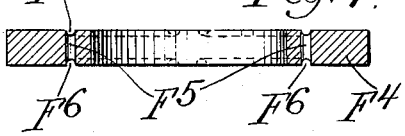
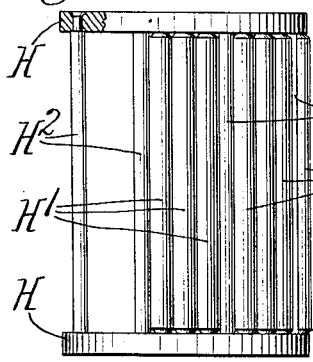
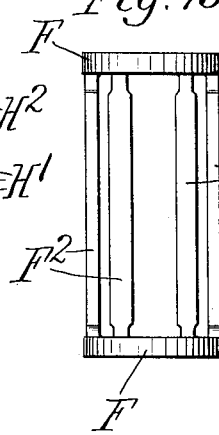
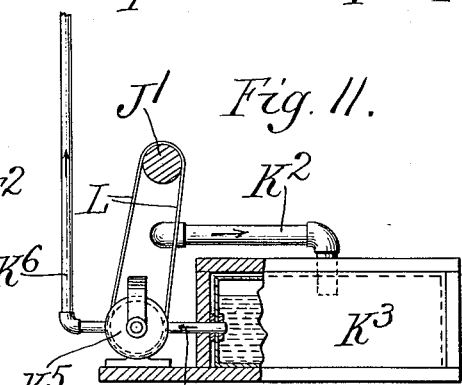
Witnesses,
Edward T. Wray.
Abbie E. Johnson
Inventor.
Edgar B. Symons.
by Parker Parker
Attorneys.

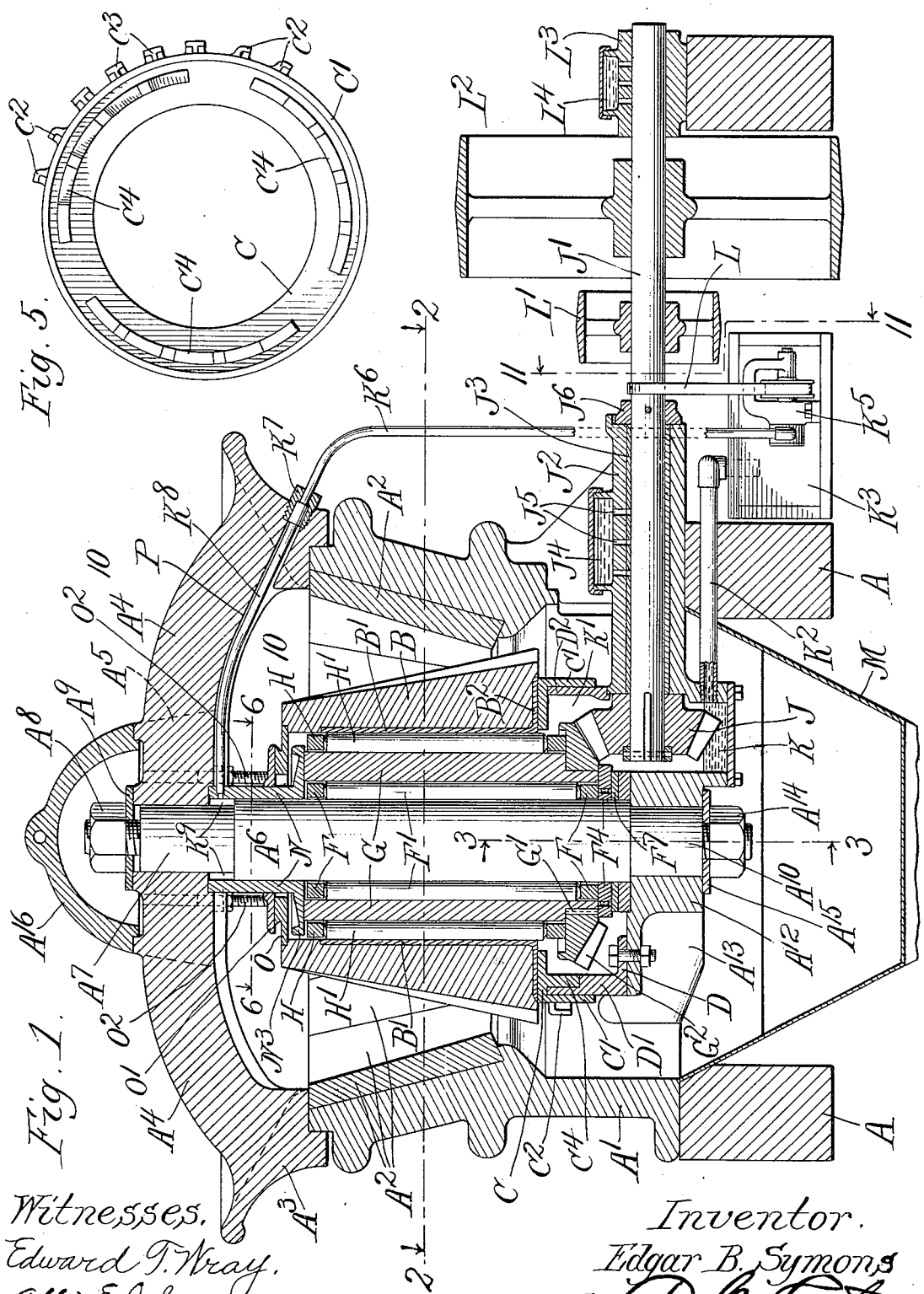

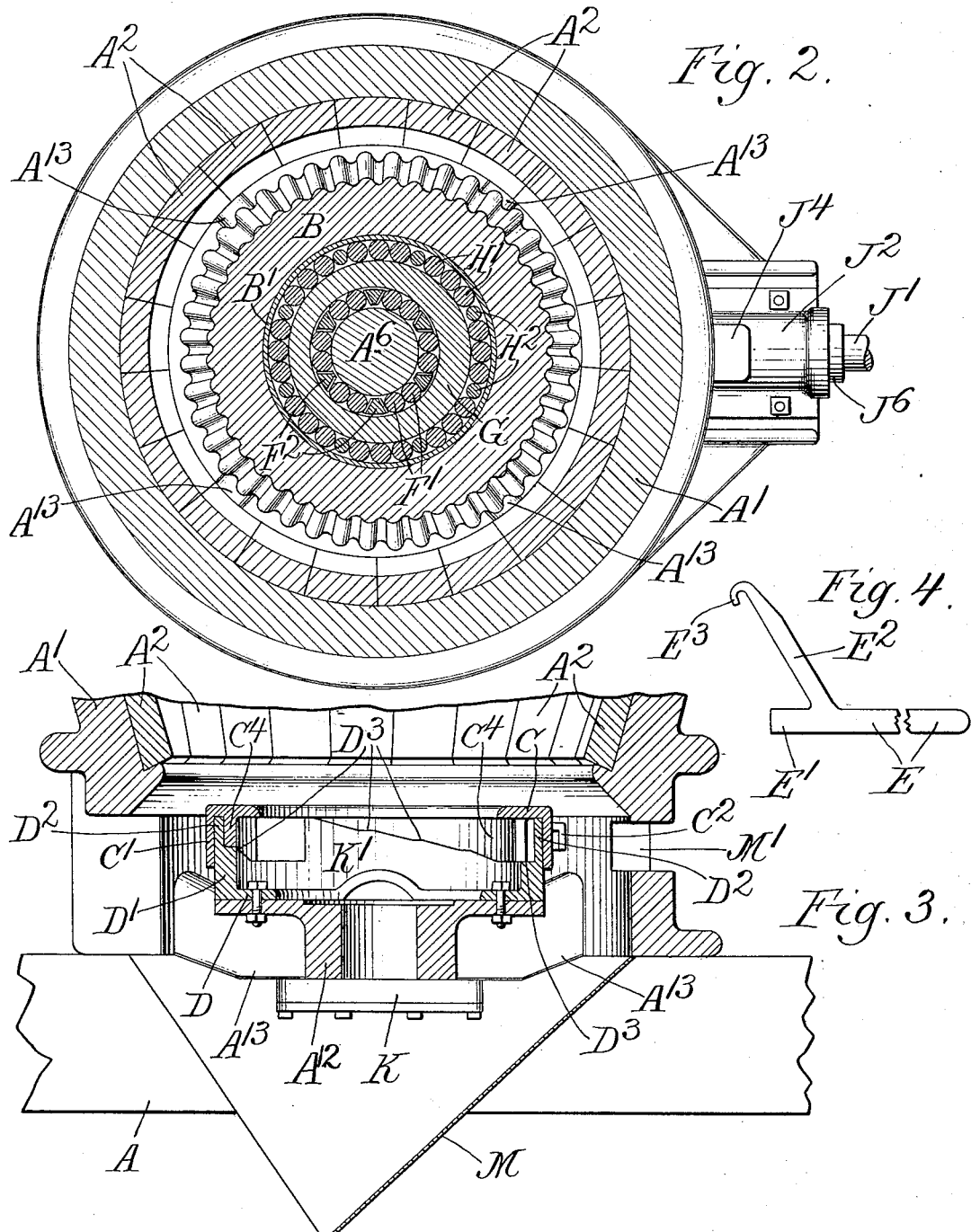

UNITED STATES PATENT OFFICE.

EDGAR B. SYMONS, OF MILWAUKEE, WISCONSIN, ASSIGNOR TO SMITH & POST COMPANY, OF MILWAUKEE, WISCONSIN, A CORPORATION OF WISCONSIN.

STONE-CRUSHER.

1,000,049.        Specification of Letters Patent.      Patented Aug. 8, 1911.

Application filed May 27, 1907. Serial No. 375,762.

*To all whom it may concern:*

Be it known that I, EDGAR B. SYMONS, a citizen of the United States, residing at Milwaukee, in the county of Milwaukee and State of Wisconsin, have invented a certain new and useful Improvement in Stone-Crushers, of which the following is a specification.

My invention relates to stone crushers.

Figure 1 is a vertical section, Fig. 2 a cross section on the line 2—2 of Fig. 1, Fig. 3 a detail vertical section on the line 3—3 of Fig. 1, Fig. 4 a detail of the adjusting lever, Fig. 5 a plan view of the adjusting ring, Fig. 6 is a cross section on the line 6—6 of Fig. 1 looking down, Fig. 7 is a cross section through a portion of the device of Fig. 1 on the line 7—7 of Fig. 6, Fig. 8 is a plan of the perforated washer on which the inner ring rests, Fig. 9 is a section of the same on the line 9—9 of Fig. 1, Fig. 10 is a section on the line 10—10 of Fig. 1, Fig. 11 is a section on line 11—11 of Fig. 1, Fig. 12 is a plan view of the outer roller cage, Fig. 13 is a side elevation of the same with parts broken away, Fig. 14 is a plan view of the inner roller cage, Fig. 15 is a side elevation of the cage with rollers removed.

Like parts are indicated by the same letter in all the figures.

A is a base on which the body of the machine rests.

$A^1$ is the hopper having removable crushing plates $A^2$ $A^2$.

$A^3$ is a ring which rests on the hopper and $A^4$ a yoke which connects the two sides of the ring with the central enlarged piece $A^5$ in which the upper end of the tie rod $A^6$ is supported. The tie rod is reduced in cross section at $A^7$ and is provided at the top with a nut $A^8$ and a washer $A^9$. The tie rod is reduced again at the bottom at $A^{10}$ to leave a shoulder whereby it is supported on the central portion $A^{12}$ of the base which is connected by suitable arms $A^{13}$ at the base of the hopper. The tie rod is provided at its lower end with a nut $A^{14}$ and washer $A^{15}$. The tie rod has at each end the projecting screw-threaded portion to receive the nuts $A^{14}$ and $A^8$.

$A^{16}$ is a shield on top of the crown piece or middle portion associated with the upper ring and it is adapted to cover the upper end of the tie rod chamber and its associated parts and to serve as a means for lifting the entire top of the crusher when desired. These several parts may be cast together or made in sections and connected together in any desired manner.

B is the crusher head preferably shaped as shown with an outer crushing surface, and preferably provided with an inner cylindrical wearing surface $B^1$ and a lower ring-like wearing surface $B^2$. On this lower surface it rests on the adjusting ring C which is provided with an outer depending ring-like rim $C^1$ provided on its outer surface with projections $C^2$ and $C^3$. Midway of the ring there is another depending ring-like cam $C^4$ having a succession of stepped bearing surfaces. The adjusting ring rests upon the adjusting support which consists of a lower part D bolted as indicated to a fixed portion of the base and provided with an upwardly projecting ring-like part $D^1$ having a portion of uniform height $D^2$ to bear upon the bottom part of the ring C and inner side of the depending ring portion $C^1$. The part $D^1$ is provided with another stepped surface $D^3$ opposed to part of the cam $C^4$. To turn the adjusting ring C on the adjusting support a lever is provided. It comprises a handle E, a foot $E^1$, a branch $E^2$ and a hook $E^3$. The foot is inserted in one or the other of the projections $C^3$ on the adjusting ring and the hook engages one or the other of the projections $C^2$ as the case may be. By operating the handle the ring will be turned in either direction to raise or lower the crushing head which rests upon it.

Immediately surrounding the tie rod is the inner cage consisting of the rings F F, the rollers $F^1$ $F^1$ pivoted between them and the spacing rods $F^2$ which with the rings form the cage. The cage rests upon a washer ring $F^4$ which is perforated as at $F^5$ $F^5$, such perforations being connected together by grooves $F^6$ $F^6$ in both surfaces of the washer ring. Thus the oil in the tie rod chamber passes down through the washer ring $F^4$ into the oil chamber. The washer ring $F^4$ is preferably supported upon the fiber or protection washer $F^7$ which rests on the central portion of the base.

Immediately outside of the inner roller cage is the eccentric sleeve G which is reduced in size at its lower end and keyed at $G^1$ to the gear wheel $G^2$. The inner edge of this gear wheel rests on the outer edge of the washer ring $F^4$ and the gear wheel supports on its upper side the outer roller cage which consists of the rings H H, the rollers H¹ pivoted therein and the tie rods H² which connect the rings together. The lower ring H and the ends of the rollers lie within the oil chamber, the upper portion of which is formed by the interlocking adjusting ring and adjusting support. The gear wheel G² meshes with the driving pinion J on the shaft J¹ which passes through the long bearing J² having the intermediate wearing sleeve J³.

J⁴ is an oil cup on the top of the bearing connected by the passage-way J⁵ with the inner surface of the bearing.

J⁶ is a collar at the outer end of the bearing surface of the shaft.

In the central portion of the base an enlarged cavity K is formed and this cavity connected with the cavity K¹ inside the interlocking adjusting ring and adjusting support forms an oil chamber in which the gear wheels run and which also contains the lower portion of the tie rod and its associated parts.

K² is an oil duct leading from the oil chamber to the oil tank K³ and K⁴ is a pipe leading thence to the oil pump K⁵ whence leads the pipe K⁶ into the screw plug K⁷ which passes into the side of the ring A³. Thence leads an oil pipe K⁸ to the annular chamber K⁹ about the upper end of the tie rod and above its upper shoulder, as shown in Fig. 1. This produces an inclosed continuous oil compartment, including the tie rod chamber, the roller cage chambers, the oil chamber which contains the gears, the reservoir of the pump and the pipes. The whole comprises a circulatory oil compartment.

The oil pump is preferably driven by means of the belt L from the shaft J¹ and this shaft is provided with the pulleys L¹ and L² the bearing L³ and the oil cup L⁴ for such bearing.

M is a chute which passes directly under the tie rod and under most of the annular passage-ways between the two crushing surfaces. It discharges at one side and just below the lower edge of the base or downwardly projecting portion of the hopper. This downwardly projecting portion has a hole M¹ for the introduction of the adjusting lever.

Having reference now to the upper part of Fig. 1 and the enlarged detail drawing of Fig. 7, and bearing in mind that the crusher head is adapted to move laterally and be adjusted vertically, the structure for applying oil and protecting the oil compartment will be described. N is a sleeve about the tie rod and projecting upwardly into a recess in the crown portion A⁵. It is provided with vertical slots N¹ on its inner face and by an outwardly and downwardly running passage N². The sleeve N is provided with the lower downwardly projecting flange N³ through which the extension of the passage N² continues across the top of the eccentric sleeve to the outer roller cage. When the oil is introduced into the annular chamber about the upper end of the tie rod, it will pass down through these passageways out into the outer cage. Seated in the upper end of the crusher head is an annulus O with an enlarged central aperture so as to permit the head and annulus to move laterally without striking the sides of the sleeve N. Another annulus O¹ surrounds the sleeve and fits it closely and is provided with a series of upwardly projecting screw rods O² each provided with a nut O³ and each adapted to project into an aperture O⁴ in the crown A⁵. The sleeve N with its flange N³ holds the roller cages and the eccentric sleeve in proper and permanent relation to the other operative parts, while the crusher head is free to be adjusted vertically and moved laterally. To keep the chamber which contains these parts properly closed is the office of the ring O¹ with its associated parts. The nuts O³ are loosened and the crusher head is then vertically adjusted whereupon the nuts O³ are tightened against the lower side of the crown piece until the parts are brought into a position such as that illustrated in Fig. 7 where the oil compartment is closed. The oil passageway K⁸ is preferably placed in a channel P in the lower part of the yoke A⁴. The ring A³ with its yoke or arms A⁴ and its central piece A⁵ may be called the crown.

It will be evident, of course, that these parts may be greatly changed in general construction, size and shape and proportions without departing from the spirit of my invention.

The use and operation of my invention will be readily understood from the foregoing description and inspection of the drawings.

Some of the important features of the invention are the following: The oiling of all the operative parts is effected by means of a continuously acting oiling apparatus operating through a permanently closed oil compartment which contains all of the parts and which is kept permanently closed though some of the operative parts are adjusted to varying positions. The oil compartment, of course, does not include the whole of the operative parts, but it does include either the operative parts or those surfaces which are to be oiled. The oiling apparatus is also operative from the driving apparatus so that it is continuously operating during the operation of the machine. In a stone crusher it is obvious, first, that the wearing parts should be thoroughly protected from the dust which is a necessary incident to the operation of a crusher, second, that the wearing parts should be thoroughly and constantly oiled, and, third, that the oil supply and oil compartment should also be thoroughly protected from the stone dust. The circulatory, variable, permanently closed and continuously operating oil supply with its various elements is one of the important features of my invention.

Another important feature of my invention is means for adjusting the size of the discharge opening. This is done by moving one or the other of the crushing surfaces which are inclined to each other so as by reason of such inclination to diminish the cross section of the interval between them. In the form of my structure shown, I have shown the crushing head as adjustable. This involves adjusting the crushing head vertically and the means which I have shown are capable, of course, of variation so as to get any degree of adjustment. Thus the space between the two crushing surfaces can be made of any desired size within predetermined limits. This is accomplished by the adjusting ring and support whereby the crusher head is maintained in its position. This adjustment takes place without in any manner affecting the position of the operative parts. It is the crusher head alone which rises and falls and not any of the driving parts or the intermediate rollers or the eccentric sleeve. Another feature of this adjustable head, however, is means for protecting and keeping permanently closed.

I claim:

1. In a stone crusher, the combination of a hollow crusher head with oscillatory mechanism therein, a driving mechanism associated therewith, a case containing said driving mechanism, said case opening into the hollow of the crusher head, and closures for the case and chamber so as to close them and an oil circulating mechanism connected above and below to such chamber and case.

2. In a stone crusher the combination of a hollow crusher head with oscillatory mechanism therein, and closures whereby the chamber in which the oscillatory mechanism is contained is closed, and an oil circulating apparatus connected at the top and bottom with such chamber, means for vertically adjusting the crusher head, said closures adapted to close the oil circulating chamber at all points of such adjustment.

3. In a stone crusher, the combination of a hollow crusher head with oscillatory mechanism therein, a driving mechanism associated therewith, a case containing said driving mechanism opening into the hollow of the crusher head, and closures for the case and chamber so as to close them and an oil circulating mechanism connected above and below to such chamber and case, and means for vertically adjusting the crusher head, said closures adapted to close the oil circulating chamber at all points of such adjustment.

4. In a stone crusher, the combination of a hopper, crown piece, base and shaft with a chambered crusher head having oscillatory devices therein comprising an eccentric sleeve and outer and inner roller cages, means for vertically adjusting the crusher head, and an upper closure for the crusher head chamber comprising a ring on the crusher head with an enlarged central aperture, and a ring associated with the crown piece adapted to have vertical but not lateral motion.

5. In a stone crusher, the combination of a hopper, crown piece, base, connecting shaft, chambered crusher head, oscillatory devices in such chamber, a sleeve surrounding the shaft, an oil passage-way which discharges into the top of such sleeve, and a closure for the upper end of the chamber comprising engaging rings on the sleeve, one capable of lateral and vertical motion, the other capable of vertical motion only.

6. In a stone crusher, the combination of a hopper, crown piece, and base, with a connecting shaft, a chambered crusher head, oscillatory devices within the same, and means for vertically adjusting the crusher head, comprising two ring-like structures, one on the base and the other intermediate the first ring and the bottom of the crusher head, said rings having opposed cam surfaces.

7. In a stone crusher, the combination of a hopper, crown piece, and base, with a connecting shaft, a chambered crusher head, oscillatory devices within the same, and means for vertically adjusting the crusher head, comprising two ring-like structures, one on the base and the other intermediate the first ring and the bottom of the crusher head, said rings having opposed cam surfaces, one of said rings capable of rotary motion and provided with exterior projections whereby it can be gripped by the adjusting lever.

8. In a stone crusher, the combination of a hopper, crown piece, base and connecting shaft, chambered crusher head, and means for vertically adjusting the same, comprising two interlocking ring-like cams between the base and the bottom of the crusher head, and means for rotating one of them.

9. In a stone crusher, the combination of a hopper, crown piece, base and connecting shaft, chambered crusher head, means for vertically adjusting the same, comprising two interlocking ring-like cams between the base and the bottom of the crusher head and means for rotating one of them, and an oscillatory device within the crusher head, and means for driving the same contained partly in the chamber formed by the cam rings.

10. In a stone crusher, the combination of a hopper, crown piece, base, connecting shaft, chambered crusher head, oscillatory device within the crusher head comprising an eccentric sleeve, and two roller bearing cages one inside the sleeve, and a washer on which the latter is supported, and a ring on which such washer rests, said washer channeled so as to connect the inner roller cage chamber through the washer with the space surrounding such ring.

11. In a stone crusher, the combination of a hopper, crown piece, connecting shaft, chambered crusher head, oscillatory device within the same consisting of an eccentric sleeve and an inner and outer roller cage, driving devices at the bottom of and connected with the eccentric sleeve, a chamber surrounding the same, the two chambers connected by openings.

12. In a stone crusher, the combination of a hopper, base, crown piece, connecting shaft, crusher head and oscillatory devices within the crusher head and about the shaft, a tank, an oil pump, and connecting passage-ways whereby a complete normally closed circulatory oil compartment is formed, including the tank, the pump and the chamber which contains the oscillatory devices.

13. In a stone crusher, the combination of a hopper, base, crown piece, connecting shaft, crusher head, oscillatory devices within the crusher head, driving wheels for the oscillatory devices, an oil tank, an oil pump, and connecting passages whereby a complete normally closed circulatory oil compartment is made containing the pump, tank, oscillatory and driving devices.

14. In a stone crusher, the combination of a hopper, base, crown piece, connecting shaft, crusher head and oscillatory devices within the crusher head and about the shaft, a tank, an oil pump and connecting passage-ways whereby a complete normally closed circulatory oil compartment is formed, including the tank, the pump and the chamber which contains the oscillatory devices, and a driving shaft and connections therefrom to the pump to operate the latter.

15. In a stone crusher, the combination of a hopper, base, crown piece, connecting shaft, crusher head, oscillatory devices within the crusher head, driving wheels for the oscillatory devices, an oil tank, an oil pump, and connecting passages whereby a complete normally closed circulatory oil compartment is made containing the pump, tank, oscillatory and driving devices, and a driving shaft and connections therefrom to the pump to operate the latter.

EDGAR B. SYMONS.

Witnesses:
O. BURCH,
A. M. STEINBERG.